United States Patent Office 3,082,187
Patented Mar. 19, 1963

3,082,187
STABILIZED POLYALKENES
Charles H. Fuchsman, University Heights, and Albright
M. Nicholson, Warrensville Heights, Ohio, assignors,
by mesne assignments, to Ferro Corporation, Cleveland, Ohio, a corporation of Ohio
No Drawing. Filed Mar. 21, 1958, Ser. No. 722,861
18 Claims. (Cl. 260—45.95)

This invention relates, as indicated, to the improvement of polyalkenes by the inclusion therein of certain stabilizer ingredients.

Polyalkene materials are subject to discoloration by oxidation, especially at elevated temperatures. Some types of polyalkenes are more susceptible to this oxidative discoloration than others because of the inherent instability to heat of the polymer or because of the presence of impurities or catalytic materials introduced by the raw materials or during manufacture. Although antioxidants have been known to be effective in retarding this discoloration, this invention concerns materials which are especially effective in the prevention of color formation at elevated temperatures because they retard the formation of color bodies by the anti-oxidant as well as by the degradation of polyalkenes. Thus, a composition which is predominantly polyalkene may be kept quite free of thermal or oxidative discoloration through the use of these stabilizing materials.

It is a principal object of this invention, therefore, to provide a polyalkene composition resistant to color formation at elevated temperatures, e.g., 100° F. and higher.

Other objects of this invention will appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

Broadly stated, this invention is in a composition of matter comprising a polyalkene having intimately dispersed therein (a) from about 0.005% to about 10% by weight of an organic phosphite ester having the general formula:

wherein $R_1$, $R_2$, and $R_3$ are each selected from the group consisting of hydrogen and hydrocarbon radicals containing from 1 to 21 carbon atoms, at least two of $R_1$, $R_2$ and $R_3$ being a hydrocarbon radical; and (b) from about 0.005% to about 10% by weight of a sulphurized phenol having the general formula:

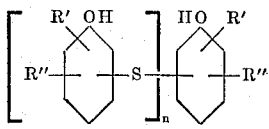

wherein $n$ is from 1 to 10, and R' and R" are each selected from the group consisting of hydrogen and alkyl radicals containing from 1 to 18 carbon atoms, at least one of R' and R" being alkyl.

The stabilizer compositions of this invention are composed of two principal ingredients, i.e., (a) an organic phosphite ester and (b) a sulphurized substituted phenol having at least one secondary or tertiary alkyl substituent. These are present in the polyalkene in a wide range of relative proportions (phosphite:sulphurized phenol) varying from a weight ratio of 1:100 to 100:1, respectively. The combination of components a and b, whether added to the polyalkene individually or as a pre-mixed stabilizing composition consisting of these two ingredients, with or without additional ingredients, is used in a concentration range of 0.005% to about 20% depending upon the susceptibility to oxidation of the polyalkene, and the degree of protection against discoloration desired. Higher percentages of the ratios high in phosphite content improve early color, but tend to decrease long-term stability to oxidatively induced discoloration. Stabilizing combinations high in sulphurized phenol are especially good for improving longterm stability at the expense, however, of early color. Combinations of the two principal stabilizer ingredients have been found to be more effective than either component alone in preventing oxidative degradation as will appear from specific examples below.

The optimum ratio of phosphite to sulphide ranges from about 1:1 to about 3:1, respectively. Thermal degradation is considered equivalent to oxidative degradation herein.

The polyalkenes contemplated for use in this invention include polyethylene and polypropylene. Of principal commercial importance are the polyethylenes and the polypropylenes which find wide use as bottles and closures, and in thin films. Reference may be had to the patent of Larchar et al. 2,816,883, for the preparation of polyethylene polymers. Other patents of interest in the polyalkene field include 2,818,407 and 2,819,257.

The organic phosphites useful herein have the general formula:

wherein $R_1$, $R_2$ and $R_3$ may be alkyl, aryl, cycloalkyl, alkaryl or aralkyl, or hydrogen, no more than one of $R_1$, $R_2$ and $R_3$ being hydrogen. $R_1$, $R_2$ and $R_3$ may be the same or different organic radicals as may be desired in the interest of activity, cost or compatibility with the polyalkene. The nature of the organic hydrocarbon radicals is not critical in the sense of contributing to the desired function of stabilizing the resin. The nature of the organic radical influences the compatibility of the phosphite with the resin. The hydrocarbon groups whether alkyl, cycloalkyl or aryl, or mixed alkaryl, or aralkyl may each contain from 1 to 21 carbon atoms.

Specific illustrative examples of phosphites which are contemplated for use in accordance with this invention include:

Alkyl phosphites:
  Tri-octyl phosphite
  Tri-2-ethyl hexyl phosphite
  Tri-lauryl phosphite
  Tri-benzyl phosphite
Cycloalkyl phosphites:
  Tricyclohexyl phosphite
  Tri(methyl cyclohexyl) phosphite
Aryl phosphites:
  Tri-phenyl phosphite
  Tricresyl phosphite
  Tri-xylyl phosphite
  Tri-t-butyl phenyl phosphite
  Tri(octyl phenyl) phosphite
  Tri(nonyl phenyl) phosphite
  Diphenyl phosphite
Mixed alkyl-aryl phosphites:
  Di-(octyl phenyl) (2-ethyl hexyl) phosphite
  Di-(phenyl) (2-ethyl hexyl) phosphite
  Di-(2-ethyl hexyl) (phenyl) phosphite Other useful phosphites will become readily apparent to those skilled in the art.

The sulphurized phenols useful in accordance herewith are conveniently obtained by treating from 1 to 2 moles of a substituted phenol with 1 mole of a sulphur halide, e.g., $SCl_2$. The procedure for preparing such sulphurized phenols is well known and need not be reproduced here. The class of materials contemplated for use in this invention has the general formula:

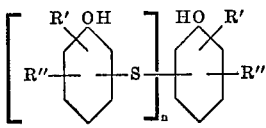

wherein $n$ is from 1 to 10, and R' and R" are each selected from the group consisting of hydrogen and alkyl radicals containing from 1 to 18 carbon atoms, at least one of R' and R" being an alkyl group.

Typical examples of materials useful in accordance herewith include:

Di-(o-tert.-amyl phenol) sulphide
Di-(o-isopropyl phenol) sulphide
Di-(6-tert.-butyl-m-cresol) sulphide
Di-(o-nonyl phenol) sulphide
Di-(α-amyl-beta naphthol) sulphide Other useful substituted phenol sulphides will become readily apparent to those skilled in the art.

In the examples cited below, the sulphides were generally prepared with an excess of $SCl_2$, whereby, 80% of the phenol corresponded to a formulation wherein $n$ in the formula was 1, and the balance corresponded to $n=2$ to 5. However, in some cases recrystallized pure sulphide ($n=1$) was used, i.e., having the general formula:

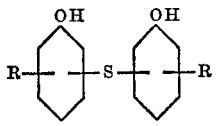

The results did not vary appreciably with the value of $n$, although the physical appearance changed from a crystalline solid to a viscous liquid as $n$ increased.

Typical reaction mixtures are:

I p-Octylphenol _____ g__ 412
Sulphur dichloride _____ g__ 113
Carbon tetrachloride _____ ml__ 500

II o-Tert-amyl phenol _____ g__ 328
Sulphur dichloride _____ g__ 113
Carbon tetrachloride _____ ml__ 500

The reaction as carried out by the addition of a $CCl_4$ solution of $SCl_2$ to a $CCl_4$ solution of the phenol with agitation at 60° F., washing with water to remove chlorides, separation of the organic phase, and then volatilization to remove the solvent.

It becomes convenient at this point to illustrate the present invention with a few specific examples of polyalkene plastic compositions containing the principal active ingredients above described, all parts being by weight.

EXAMPLE 1

| | Parts |
|---|---|
| Polyethylene | 100 |
| Tri-2-ethyl hexyl phosphite | 0.225 |
| Di-(o-tert.-amyl phenol) sulphide | 0.075 |

EXAMPLE 2

| | |
|---|---|
| Polyethylene | 100 |
| Tri-(nonyl phenyl) phosphite | 0.30 |
| Di-(o-isopropyl phenol) sulphide | 0.15 |

EXAMPLE 3

| | |
|---|---|
| Polyethylene | 100 |
| Bis-(octyl phenyl)(2-ethyl hexyl) phosphite | 0.30 |
| Di-(6-t-butyl-m-cresol) sulphide | 0.15 |

EXAMPLE 4

| | |
|---|---|
| Polyethylene | 100 |
| Tri-(nonyl phenyl) phosphite | 0.2 |
| Di-(o-tert.-amyl phenol) sulphide | 0.1 |

EXAMPLE 5

| | |
|---|---|
| Polyethylene | 100 |
| Bis-(octyl phenyl)(2-ethyl hexyl) phosphite | 0.15 |
| o-Isopropyl phenol sulphurized with $SCl_2$ at 1:1 molar ratio | 0.15 |

EXAMPLE 6

| | |
|---|---|
| Polyethylene | 100 |
| Tri-(nonylphenyl) phosphite | 0.30 |
| Bis-(6-tert.-butyl-m-cresol) sulphide | 0.15 |

EXAMPLE 7

| | |
|---|---|
| Polyethylene | 100 |
| Tri-(nonyl phenyl) phosphite | 1.5 |
| Sulphurized (o-t-amylphenol) | 0.5 |

The following table shows the results obtained when the principal stabilizers are used alone and in combination. The polyalkene used in these tests was linear polyethylene. Samples were compounded according to the percentages given below and heated in an oven at 400° F. for 90 or 120 minutes. A rating of "1" means least discoloration (creamy white-characteristic of polyethylene). A rating of "3" means the most discoloration (brown). Untreated polyethylene turns very brown under the test conditions, i.e., a rating of 3+.

Table 1

| Additive | Rating | Min. of heating @ 400° F. |
|---|---|---|
| A. 0.3% (2 parts tris (nonylphenyl) phosphite and 1 part sulphurized-o-t-amylphenol | 1 | 120 |
| B. 0.3% tris (nonylphenyl) phosphite | 3 | 120 |
| C. 0.3% sulphurized-o-t-amylphenol | 2 | 120 |
| A. 0.3% Bis (octylphenyl) (2-ethylhexyl) phosphite | 3 | 120 |
| B. 0.3% sulphurized dibutylphenol | 2 | 120 |
| C. 0.15% Bis(octylpheny) (2-ethylhexyl) phosphite; 0.15% Sulphurized dibutylphenol | 1 | 120 |
| A. 0.3% Bis(octylphenyl) (2-ethylhexyl) phosphite | 3 | 90 |
| B. 0.3% sulphurized o-i-propylphenol | 2 | 90 |
| C. 0.15% Bis(octylphenyl) (2-ethylhexyl) phosphite; 0.15% sulphurized o-i-propylphenol | 1 | 90 |
| A. 0.3% Tris(nonylphenyl) phosphite | 2 | 120 |
| B. 0.3% Bis(6-t-butyl-m-cresol) sulphide | 3 | 120 |
| C. 0.30% Tris(nonylphenyl) phosphite; 0.15% Bis(6-t-butyl-m-cresol) sulphide | 1 | 120 |
| In polypropylene: | | Hrs. of heating at 270° F. |
| A. 1.0% tris-nonylphenyl phosphite | 2 | 250 |
| B. 0.3% sulphurized o-tertiary amyl phenol | 3 | 250 |
| C. 0.23% tris-nonylphenyl phosphite; 0.07% sulphurized o-tertiary amyl phenol | 1 | 250 |

The following table shows the results obtained when the principal stabilizers are used alone and in combination in branched polyethylene. Samples were compounded according to the percentages given below and heated in an oven to 400° F. for a period of 120 minutes. The colors are indicated, very light cream color being the most satisfactory and dark brown being unsatisfactory.

Table II
Tests on Branched Polyethylene

| Antioxidant | Color after 120 Minutes at 400° F. |
|---|---|
| None | Dark Brown. |
| Tris(nonylphenyl) phosphite 0.3% | Do. |
| Bis(octylphenyl) 2-ethyl hexyl phosphite 0.3% | Do. |
| Bis(6-tert. butyl m-cresol) sulphide 0.3% | Brown. |
| Bis(octyl phenyl) 2-ethyl hexyl phosphite 0.15%; Bis(6-tert. butyl m-cresol) sulphide 0.15% | Amber discoloration. |
| Bis(octyl phenyl) 2-ethyl hexyl phosphite 0.3%; Bis(6-tert. butyl m-cresol) sulphide 0.15% | Very light cream color. |
| Tris(nonyl phenyl) phosphite 0.13%; Bis(ortho isopropyl phenol sulphide 0.07% | Do. |

Bottles, bottle caps, nozzles for tin cans, plastic sheets, etc. may be made from the polyalkenes treated in accordance herewith by the molding techniques presently commonly employed in the art. Discoloration of such articles when exposed to elevated temperatures during forming is not encountered. Scrap polymer so treated withstands the increased heat exposure time in reworking much more satisfactorily than the untreated polymer.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A composition comprising normally solid polyproylene and in intimate admixture therewith stabilizing amounts of (1) an organic phosphite having the general formula:

in which $R_1$, $R_2$ and $R_3$ are members of the group consisting of alkyl radicals of 8 to 12 carbon atoms, and alkyl aryl radicals of 14 to 15 carbon atoms, and (2) a bis-(alkyl phenol) sulfide of the general formula:

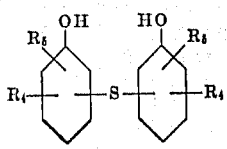

where $R_4$ is a meta substituent and a member of the group consisting of hydrogen and methyl and $R_5$ is an alkyl group of 4 to 9 carbon atoms and attached to the phenol nucleus at a position other than the meta position, the weight ratio of said phosphite to said sulfide being about 1:1 to 3:1.

2. A composition as defined in claim 1 in which the total amount of said phosphite and said sulfide is about 0.3 to 0.45% by weight of the polypropylene.

3. A composition comprising (1) normally solid polypropylene (2) about 0.005 to 10% by weight of the polypropylene of an organic phosphite having the general formula:

in which $R_1$, $R_2$ and $R_3$ are organic radicals of the group consisting of alkyl groups of about 8 to 12 carbon atoms, and alkyl aryl groups of about 14 to 15 carbon atoms, and (3) about 0.005 to 10% by weight of the polypropylene of a bis-(alkyl phenol) sulfide of the general formula:

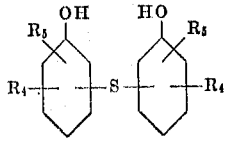

where $R_4$ is a meta substituent and a member of the group consisting of hydrogen and methyl and $R_5$ is an alkyl group to 4 to 9 carbon atoms and attached to the phenol nucleus at a position different from the position of said $R_4$ substituent, the weight ratio of said phosphite to said sulfide being about 1:1 to 3:1.

4. A composition as defined in claim 3 in which the phosphite is tri-(2-ethyl hexyl) phosphite.

5. A composition as defined in claim 3 in which the phosphite is tri lauryl phosphite.

6. A composition as defined in claim 3 in which the phosphite is bis-(octylphenyl) (2-ethyl hexyl) phosphite.

7. A composition as defined in claim 3 in which the sulfide is di-(6-tert. butyl-meta-cresol) sulfide.

8. A composition as defined in claim 3 in which the sulfide is bis-(para-octyl phenol) sulfide.

9. A composition as defined in claim 3 in which $R_4$ is methyl and $R_5$ is an alkyl group of 4 to 5 carbon atoms, and the total amount of said sulfide and said phosphite is about 0.3 to .45% by weight of the polypropylene.

10. A composition comprising (1) normally solid polypropylene, (2) about 0.005 to 10% by weight of the polypropylene of tri-(2-ethyl hexyl) phosphite and (3) about 0.005 to 10% by weight of the polypropylene of di-(ortho-tertiary amylphenol) sulfide, the weight ratio of said phosphite to said sulfide being about 1:1 to 3:1.

11. A composition comprising (1) normally solid polypropylene, (2) about 0.005 to 10% by weight of the polypropylene of tri lauryl phosphite and (3) about 0.005 to 10% by weight of the polypropylene of di-(6-tert-butyl-meta-cresol) sulfide, the weight ratio of said phosphite to said sulfide being about 1:1 to 3:1.

12. A composition comprising (1) normally solid polypropylene, (2) about 0.005 to 10% by weight of the polypropylene of bis-(octylphenyl) (2-ethyl hexyl) phosphite and (3) about 0.005 to 10% by weight of the polypropylene of di-(ortho-tertiary amylphenol) sulfide, the weight ratio of said phosphite to said sulfide being about 1:1 to 3:1.

13. A composition comprising (1) normally solid polypropylene, (2) tris nonyl phenyl phosphite and (3) di-(6-tert. butyl-meta-cresol) sulfide, the total amount of said phosphite and said sulfide being about .4% by weight of the polypropylene and the weight ratio of said phosphite to said sulfide being about 1:1 to 3:1.

14. A composition comprising (1) normally solid polypropylene, (2) tri-(2-ethyl hexyl) phosphite and (3) bis-(para-octyl phenol) sulfide, the total amount of said phosphite and said sulfide being about .4% by weight, the weight ratio of said phosphite to said sulfide being about 1:1 to 3:1.

15. A composition comprising (1) normally solid polypropylene, (2) a tri alkyl aryl phosphite in which said alkyl aryl group has 14 to 15 carbon atoms and (3) di-(6-tert. butyl-meta-cresol) sulfide, the total amount of said phosphite and said sulfide being about 0.3 to .45% by weight of the polypropylene and the weight ratio of said phosphite to said sulfide being about 1:1 to 3:1.

16. A composition comprising (1) normally solid polypropylene, (2) tri lauryl phosphite and (3) di-(6-tert. butyl-meta-cresol) sulfide, the total amount of said phosphite and said sulfide being about 0.3 to .45% by weight of the polypropylene and the weight ratio of said phosphite to said sulfide being about 1:1 to 3:1.

17. A composition comprising normally solid polypropylene and in admixture therewith stabilizing amounts of (1) tris-nonyl phenyl phosphite and (2) di(O-tert.-amyl phenol) sulfide, the weight ratio of said phosphite to said sulfide being about 1:1 to 3:1.

18. A composition comprising normally solid polypropylene and in admixture therewith stabilizing amounts of (1) tris-nonyl phenyl phosphite and (2) di(O-tert.-amyl phenol) sulfide, the weight ratio of said phosphite to said sulfide being about 1:1 to 3:1, the total amount of said sulfide and said phosphite being about 0.3% by weight of the polypropylene.

References Cited in the file of this patent

UNITED STATES PATENTS

| | | |
|---|---|---|
| 2,175,082 | Hagen et al. | Oct. 3, 1939 |
| 2,564,646 | Leistner et al. | Aug. 14, 1951 |
| 2,581,930 | Albert | Jan. 8, 1952 |
| 2,605,249 | Albert | July 29, 1952 |
| 2,733,226 | Hunter | Jan. 31, 1956 |
| 2,860,115 | Hecker et al. | Nov. 11, 1958 |

(Other references on following page)

UNITED STATES PATENTS

| | | |
|---|---|---|
| 2,867,594 | Hansen et al. | Jan. 6, 1959 |
| 2,985,617 | Salyer et al. | May 23, 1961 |

FOREIGN PATENTS

| | | |
|---|---|---|
| 201,160 | Australia | Jan. 11, 1956 |
| 1,021,571 | Germany | Dec. 27, 1957 |

OTHER REFERENCES

Smith: "British Plastics," vol. 25 (September 1952), pp. 304–7.

Raff: Polyethylene, p. 103 (1956), Interscience Publishers, Inc., New York.